(12) United States Patent
Urra et al.

(10) Patent No.: US 8,387,024 B2
(45) Date of Patent: Feb. 26, 2013

(54) MULTILINGUAL SOFTWARE TESTING TOOL

(75) Inventors: Rodrigo Andres Urra, Rochester, NY (US); Xin Guo, Penfield, NY (US); William Soon Hock Tay, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1502 days.

(21) Appl. No.: 11/736,716

(22) Filed: Apr. 18, 2007

(65) Prior Publication Data

US 2008/0263526 A1    Oct. 23, 2008

(51) Int. Cl.
*G06F 9/44* (2006.01)
*G06F 11/00* (2006.01)

(52) U.S. Cl. .......... 717/131; 717/124; 714/38.1

(58) Field of Classification Search .......... 717/124–135; 714/37, 38.1
See application file for complete search history.

(56) References Cited

U.S. PATENT DOCUMENTS

| | | | |
|---|---|---|---|
| 5,572,668 A * | 11/1996 | See et al. ........................ 714/38 |
| 5,583,761 A | 12/1996 | Chou | |
| 5,664,206 A | 9/1997 | Murrow et al. | |
| 5,903,859 A * | 5/1999 | Stone et al. ........................ 704/8 |
| 6,092,037 A * | 7/2000 | Stone et al. ........................ 704/8 |
| 6,185,729 B1 | 2/2001 | Watanabe et al. | |
| 6,530,039 B1 * | 3/2003 | Yang ................................. 704/8 |
| 6,662,312 B1 * | 12/2003 | Keller et al. ..................... 714/38 |
| 6,907,546 B1 * | 6/2005 | Haswell et al. ................. 714/38 |
| 6,983,451 B2 * | 1/2006 | Colaiuta ........................ 717/125 |
| 7,299,452 B1 * | 11/2007 | Zhang et al. ..................... 717/124 |
| 7,398,469 B2 * | 7/2008 | Kisamore et al. ............. 717/124 |
| 7,543,189 B2 * | 6/2009 | Fichter et al. .................. 714/38 |
| 2002/0091509 A1 * | 7/2002 | Zoarez et al. ..................... 704/6 |
| 2003/0097318 A1 * | 5/2003 | Yu et al. .......................... 705/35 |
| 2004/0205721 A1 * | 10/2004 | Colaiuta ........................ 717/124 |
| 2005/0044533 A1 * | 2/2005 | Nesbit et al. .................. 717/124 |
| 2005/0065772 A1 | 3/2005 | Atkin et al. | |
| 2005/0097109 A1 * | 5/2005 | Bitsch .......................... 707/100 |
| 2005/0137844 A1 * | 6/2005 | Voruganti ........................ 704/2 |
| 2005/0204343 A1 * | 9/2005 | Kisamore et al. ............. 717/124 |
| 2006/0106593 A1 | 5/2006 | Schultz et al. | |
| 2006/0271920 A1 * | 11/2006 | Abouelsaadat ............... 717/137 |
| 2007/0006039 A1 * | 1/2007 | Fichter et al. .................. 714/38 |

* cited by examiner

*Primary Examiner* — Wei Zhen
*Assistant Examiner* — Qing Chen
(74) *Attorney, Agent, or Firm* — Fox Rothschild LLP

(57) ABSTRACT

A software product testing system may include a knowledge base with a data set that includes multiple possible actions and, for each action, language-specific format rules for inputs and outputs associated with the action. The software product testing system may include a test case generator that selects a test case in a target language for a software product. The test case may include a selected action to be taken by a software product, an input to prompt the action, and an expected output that corresponds to the selected action and the input. The expected output has a format corresponding to a language-specific format rule of the target language. The software product testing system may also include a test verifier that determines whether an output generated by application of the test case to the software product matches the expected output.

15 Claims, 2 Drawing Sheets

| PARAMETER | INPUT | ACTION | EXPECTED OUTPUT |
|---|---|---|---|
| * | 1,3,4 | SORT | 1,3,4 |
| 22 | SEPT 23, 2006 | DATE | 23.09.2006 |
| 4+ | 10:39 PM | TIME | 22:39 |
| A | $1.00 | CURRENCY | 1.50E |

TEST CASE CHART — 310 / 315 / 305 / 320 / 300 TEST CASE

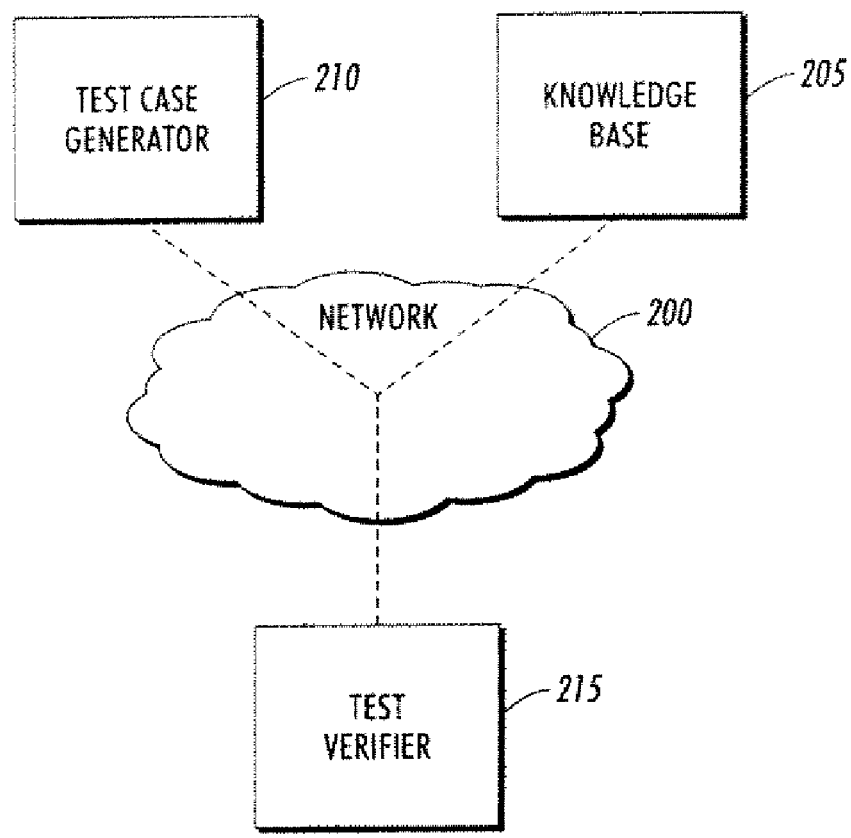

MULTILINGUAL SOFTWARE TESTING TOOL

BACKGROUND

Various methods of testing a software product are well known in the art. For example, U.S. Pat. No. 6,185,729, the disclosure of which is incorporated herein by reference, discloses a method and system for developing and testing software in English for international development. Errors and hugs can be found before the software is tested in localized versions. U.S. Patent Application Publication No. 2006/0106593, the disclosure of which is incorporated herein by reference, discloses a method for testing bidirectional language script prior to transaction in an application under test. The method maps unidirectional text characters from right to left.

However, in today's global economy, it is often desired to have a software product tested where the software is operated in multiple languages. Some of these languages may not be native to the human tester. Currently, multiple testers must be employed or a single tester must be able to translate a test case (i.e., standard inputs and outputs) for a software product. For example, a tester may input test information to a software product. The product may perform the test and output the results to the tester in a language that is not native to the tester. The output may then be interpreted by the foreign tester, and its meaning may be related back to the tester's native language. However, having the tester verify and interpret product output is a time-consuming process and risks the loss of information and/or accuracy during translation.

The disclosure contained herein describes the methods of resolving one or more of the problems discussed above.

SUMMARY

In an embodiment, a software product testing system includes a knowledge base that contains a data set. The data set includes a group of possible actions and, for each action, a set of language-specific format rules for inputs and outputs associated with the action. The system also includes a test case generator that selects a test case in a target language for a software product. The test case includes a selected action to be taken by a software product, an input to prompt the action, and an expected output that corresponds to the selected action and the input. The expected output has a format corresponding to a language-specific format rule of the target language. The system also includes a test verifier that determines whether an output generated by the application of the test case to the software product matches the expected output.

Optionally, the knowledge base may be configured to translate a native language input into a target language input. The test case generator may be configured to receive an input of a parameter so that the parameter prompts selection of the selected action. The format of the expected output may include at least one of the following: a sorting format, a date format, a time format and a currency format.

In another embodiment, a computer implemented method of testing the operation of a software product includes receiving an indication of whether a native language of a human tester matches a target language of a software product to be tested, and receiving a testing parameter. If the native language and the target language are different, the method may include generating a test case in the target language, wherein the test case includes an input, an action corresponding to the parameter, and an expected output corresponding to the input and the action. The method also may include applying the test case to the software product by entering the input into a computing device that is running the software product and receiving generated output after the software product implements the action. The method also may include analyzing the generated output to determine whether the generated output matches the expected output, as well as displaying an indication of whether the generated output matches the expected output.

Optionally, the action may include one or more of the following actions: sorting, generating a date, generating a time, converting a number to a representation of currency, inserting punctuation, adding a keystroke, and correcting pronunciation. The target language may be the language used to test the software product. The act of displaying an indication may include actions such as notifying a user if the test case was a success and/or notifying a user if the test case was a failure. If the indication indicates that the native language and the target language are the same, then the method may include analyzing a generated output to determine whether the generated output matches an expected output, and displaying an indication of whether the generated output matches the expected output.

In another embodiment, a method of testing the operation of a software product includes determining whether a native language of a human tester matches a target language of a software product to be tested. If the native language does not match the target language, the method may include selecting a test case in the target language, wherein the test case includes an input in the target language, an action, and an expected output in the target language. The method may apply the test case to the software product by entering the input into a computing device that is running the software product, and receiving generated output after the software product implements the action. The method may include automatically analyzing the generated output to determine whether the generated output matches the expected output, and displaying an indication of whether the generated output matches the expected output.

Optionally, the action of the test case may include one or more of the following actions: sorting, generating a date, generating a time, converting a number to a representation of currency, inserting punctuation, adding a keystroke, and correcting pronunciation. Analyzing the generated output may include determining whether at least a portion of the expected output has a format that matches an expected format of the target language. The expected format may include formats such as: a sorting format, a date format, a time format or a currency format. The selecting may include receiving a parameter, and identifying a target language test case that includes an action corresponding to the received parameter. Alternatively, the selecting may include receiving, a parameter, identifying whether any target language test case includes an action corresponding to the received parameter, and, if no target language test case includes an action corresponding to the received parameter, notifying the tester that the parameter cannot be used to test the software product in the target language.

BRIEF DESCRIPTION OF THE DRAWINGS

FIG. 2 depicts an exemplary embodiment of a multilingual testing system.

FIG. 3 depicts an exemplary embodiment of a chart of test cases.

DETAILED DESCRIPTION

Figure 1:
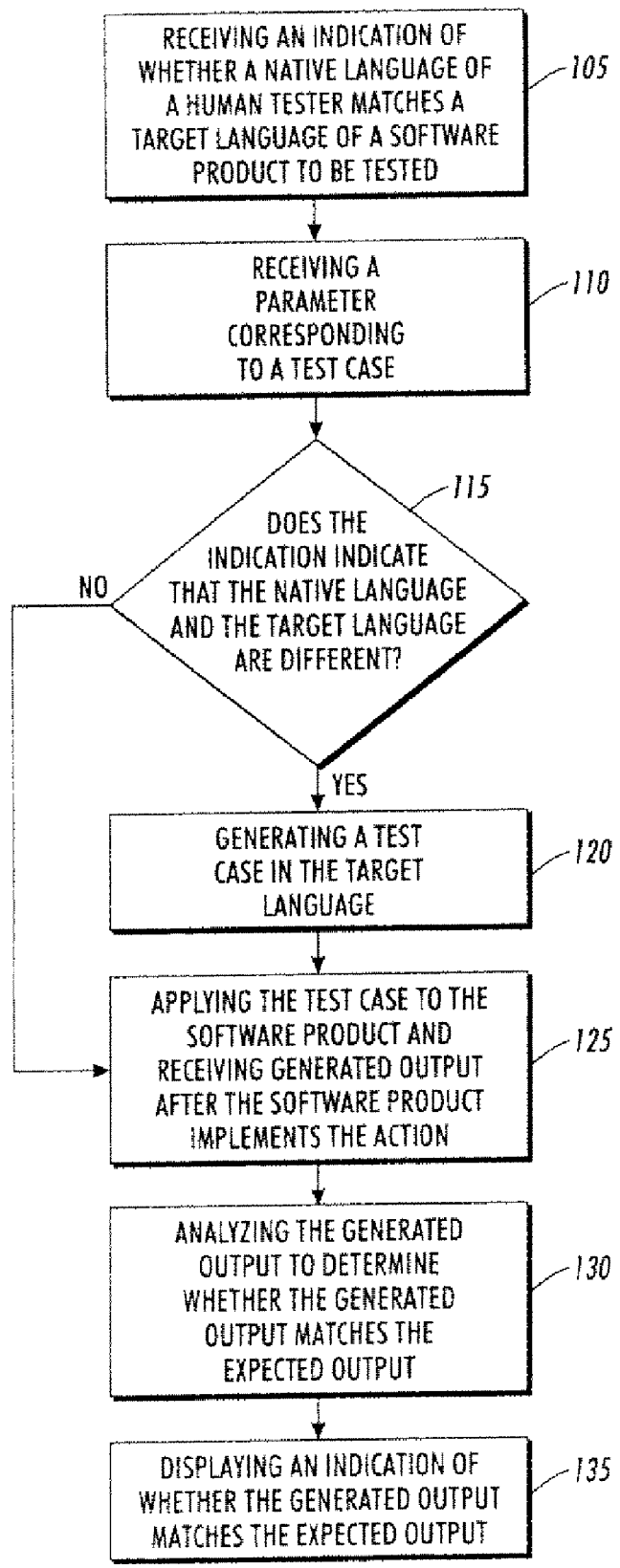
FIG. 1 discloses an exemplary embodiment of an intelligent multilingual testing tool.

Before the present methods systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

A testing tool is a software application used to test operation of one or more features of a software product. Software is machine language understood by a computing device. As cited herein, the tested software includes any computer-executable code, such as computer programs, scripts, firmware, or other code.

A native language is a language that is indigenous to or known by the human tester. In one embodiment, the native language may be the language of the country where the human tester is located. In one embodiment, the native language may be a language with which the human tester is proficient. In another embodiment, the native language may be a language which the human tester speaks at home.

A target language is the language for which operation of the software product is desired to be tested. In the embodiments described in this document, a human tester may use a testing tool to test a software product in a target language unfamiliar to the tester. For example, an American human tester may want to determine if the product will function properly when operated in Japanese. However, English may be the human tester's native language. If the tester wants to determine if the product functions properly in Japanese, then Japanese will be the target language. Similarly, if the tester wants to check if the product can function properly in French, then French may be the target language.

FIG. 1 discloses one exemplary embodiment of a multilingual testing tool. According to FIG. 1, an indication of whether a native language of a human tester matches a target language of a software product to be tested may be received 105. In one embodiment, the human tester may indicate whether the native language matches the target language by inputting an indication of the tester's native language, and optionally the target language, into the system. In one embodiment, the indication of the native language and/or target language may be chosen from a displayed group of pre-selected languages. In one embodiment the display of the pre-selected group of languages may be, but is not limited to, a list, a table, or a drop-down menu. Alternatively, the human tester may input the name of the language into an electronic input. In another embodiment, the tester may use a sentence, phrase or word which indicates the language. In one embodiment, the system may test multiple target languages of a software product, one language at a time. In another embodiment, the system can test multiple languages simultaneously.

The testing tool may receive a parameter corresponding to a test case 110. A test case is an input, action, and expected output that may be used to determine if one or more features of a software product are functioning in a correct manner. Proper operation of a software product may be analyzed through the use of a test case. A test case may include a single input/action/output set, or it may include multiple input/action/output combinations. In one embodiment, there may be a variety of test cases for each native language with each target language. A parameter is an attribute of the test case which denotes the type of test to be performed. Alternatively, a parameter may simply be an input for a test case.

The testing tool may determine if the native language and the target language are different 115. The languages are different if the native language does not match the target language. If the native language and the target language are different, then a test case in the target language may be generated 120. The test case may include an input, an action corresponding to the received parameter, and an expected output corresponding to the input and the action. Examples of such parameters are discussed below in the text corresponding to FIG. 3.

After a test case is generated, the test case may be applied 125. In one embodiment, a human tester may apply the test case to the software product by causing the test case to be entered into the testing tool or a device that is operating the testing tool. In another embodiment, the test case may be automatically applied to the software product. In one embodiment, if the applying is automatic, the input may be automatically applied from the test case.

In one embodiment, if the native language and the target language are the same 115, then the system can immediately apply a test case to the software product 125. The test case may be selected or entered directly by the human tester. A translation may be unnecessary if the human tester understands the test case for the software product.

Regardless of whether the native language matches the target language, after the test case is applied to the software product, a generated output may be received after the software product implements the action 125. The generated output is the outcome of the testing. In one embodiment, testing the software product input in the target language may create the generated output. In one embodiment, the generated output may be in the target language.

The generated output may then be analyzed to determine whether the generated output matches the expected output 130. An indication may be displayed which indicates whether the generated output matches the expected output 135. If the generated output does not match the expected output, the system may issue an indication noting the failure. Alternatively, if the product output matches the expected output, then the system may issue a notification noting the success. In one embodiment, the indication may be a light that is red when the test is a failure and green when the test is a success. Alternatively, the indication may be, but is not limited to, a noise generated from the test verifier, a message displayed on the test verifier, and/or a message transmitted to a tester through electronic mail, fax, printer or other electronic device.

FIG. 2 discloses an exemplary multilingual testing tool system including a knowledge base 205, a test case generator 210 and a test verifier 215. The knowledge base 205, a test case generator 210 and a test verifier 215 may all be housed in a single device. Alternatively, they may be in multiple devices ad may communicate with one another via a network 220 such as a local area network (LAN), wide area network (WAN), Internet or another communication network. In one embodiment, a test case in a target language may be selected using a knowledge base 205 and a test case generator 210. A knowledge base 205 is a collection of intelligent rules or procedures for each target language, stored in a computer-readable format. The rules and/or procedures may be stored in a processor readable storage medium. A knowledge base 205 may include data structures such as a chart, table or database. The rules and procedures in the knowledge base 205 include language-specific format rules for outputs associated with various actions. More specifically, a knowledge base 205 may include procedures and language-specific format rules for translating the native language input or verifying a target language output for a particular action. For example, for an action that will generate a date in a software product, if the target language is American English the format rules may recognize a date of "4/13/10" as a valid representation of the 13 Apr., 2010. However, if the target language is that of a European country, then the representation may be improper, as "13.04.10" would be correct in those countries.

A test case generator 210 may be used to select a test case in a target language for a product. In one embodiment, a test case generator 210 may be, but is not limited to, a processor or server. A generator 210 may select a test case in a target language for a software product. In one embodiment, the test case generator 210 may retrieve information from the knowledge base 210 to populate a test case in a target language. Optionally, a test case generator 210 may translate a native language input into the input of the target language.

The test case may include a selected action to be taken by a software product, an input to prompt the action, and an expected output that may correspond to the selected action and the generated input. The expected output may include a format corresponding to a language-specific format rule, such as a numeric representation of date or time, or rules for sorting (e.g., alphabetically if the target language is English; by the number of key strokes in a character if in Japanese, etc.). The expected output may include a format that corresponds to the target language.

The test case is applied to the software product to generate an output. In some embodiments, the test case may apply the input to the software product automatically, without the requirement for user intervention, since the input may not be in the user's native language. A test verifier 215 is a device or application or code segment that can read the expected output and the generated output. The test verifier 215 may determine whether the generated output of the software product test case matches the expected output.

FIG. 3 depicts an exemplary embodiment of a chart of test case variables. Variables for one or more test cases may be stored in the knowledge base and used by the testing tool to test the software product. Variables in a test case 300 may reflect attributes such as a parameter 305, an input 310, an action 315 and an expected output 320.

A parameter 305 may be used to determine which specific test case the multilingual testing tool should run. A parameter 305 may be, for example, a number, a letter, a word or group of words, a symbol, or another graphic. In one embodiment, a unique parameter may be associated with each test case. A parameter may be used to determine which test case to run in the testing tool.

The multilingual testing tool may use an input 310 to perform a selected test case 300 of the software product. An input may correspond to a parameter 305. In one embodiment, an input may be the information placed inside the testing tool. In one embodiment, a tester need not supply the input, as the input may be generated by reference to the parameter in the knowledge base. In an alternate embodiment, a tester may supply the input. The input may be, but is not limited to, a number, an alphanumeric character, a value, a currency, a symbol or a combination thereof. In one embodiment, the input may depend upon the action being performed in the test case.

A test case may include an action 315 corresponding to a parameter. An action 315 tests an application of a software product by specifying how to manipulate an input and/or other data to test the software product. An action may be, but is not limited to an expectation that the software product will sort, generate a date or time, convert a number to a representation of currency, insert punctuation, add a keystroke, correct pronunciation or another instruction. In one embodiment, the action may vary based on the language in which the test case is being performed. In one embodiment, an action may be performed based on factors such as, but not limited to, the software product's capability and purpose, the input, and the expected output.

For example, an action may include features that cause a software product to accept multiple input items and sort those values, such as alphanumerical or other values. Alternatively, an action may expect that the product convert a date or time in one format into another format based on the native and target languages. In another embodiment, an action may be to convert one country's currency to another country's currency using the current exchange rate. Alternatively, some actions, such as numbering, may need no translation between a native and target language as both countries may have the same number system. In another example, a translation may not be possible since there may be no equivalent in the target language. For example, translating uppercase to lowercase letters in English to Japanese would not be possible as Japanese does not distinguish between lowercase letters and uppercase letters. Therefore, the testing tool expected output may be "not available."

The test case may also be associated with an expected output 320 that corresponds to the selected action and the generated input. An expected output 320 is the correct or desired result for a particular test case, which may include data, format or both. An expected output may correspond to the input and the action. In one embodiment, an expected output 320 may be supplied by the specific test case, along with the input 310. Alternatively, if a tester supplies the input 310, the tester may also supply the expected output 320. The expected output may have a format that varies depending on the target language. For example, differences between a native language and a target language may appear in sorting formats (e.g., sorting alphabetically vs. sorting based on number of strokes in a character), date formats (e.g., month first vs. day first), time (e.g., 12-hour clock vs. 24-hour clock, the use of colons vs. use of periods), and currency (e.g., currency representations, use of periods vs. use of commas as decimals).

In one example of the testing tool, a human tester may want to test a German version of a software product. For example, referring again to FIG. 1, the tester's native language may be English and the target language may be German 105. The human tester may input "22" as a parameter corresponding to the type of test to be performed on the software product 110. Since the tester's native language does not match the target language 115, the system may use the generator and the knowledge base to determine a test case 120. The parameter "22" may be used to determine the input, action and expected output. For parameter "22", the local input may be Sep. 23, 2006 and an action may be "date." If the test case exists in the target language, the test case may then extract the expected output. The expected output may be "23.09.2006", which corresponds to German format. The test case may be applied to the software product by entering the input 125. In some embodiments, the testing tool may enter the input automatically in the target language. In other embodiments, the tool may accept an input in the tester's native language, translate the native language output into the target language, and then enter the target language input into the software program for testing. The test case generator may use the input and the action to produce a generated output 125. The generated output may be "23.09.2006" and may be compared to the expected output of "23.09.2006". A test verifier 130 may then indicate that the venerated output matches the expected output 135 and that the German version of the product functions correctly.

Similarly, FIG. 3 shows that the test case 300 includes a parameter "4+" corresponding to the "time" action. In the United States native language, a time may be represented as "10:39 pm", while the expected corresponding output in a German target language format would be "22:39". Different expected outputs would be possible if the target languages were different. For example, an expected output in a target language of Finland may be "22.39", an expected output in a target language of Norway may be "K1 22.39", and an expected output in a target language of China may be "22 时 39 分".

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to encompassed by the following claims.

What is claimed is:

1. A software product testing system, comprising:
a knowledge base stored on a non-transitory computer readable medium comprising a data set that includes a plurality of testing parameters, possible actions associated with each testing parameter and, for each action, a plurality of language-specific format rules for inputs and outputs associated with the action; and
a computing device operably connected to the non-transitory computer readable medium and configured to run:
a test case generator that selects a test case in a target language for a software product based upon a testing parameter associated with the software product, wherein the testing parameter is an attribute of the test case that denotes which type of test is to be performed, the test case comprising:
a selected action to be taken by a software product, wherein the selected action is selected from the possible actions stored in the knowledge base and based upon the testing parameter associated with the software product,
an input to prompt the action, and
an expected output that corresponds to the selected action and the input, wherein the expected output has a format corresponding to a language-specific format rule for the selected action in the target language and is determined by the selected action and the input to prompt the action, and
a test verifier that determines whether an output generated by an application of the test case for the software product matches the expected output as defined by the testing parameter associated with the software product.

2. The software product testing system of claim 1, wherein the knowledge base is configured to translate a native language input into an input in the target language.

3. The software product testing system of claim 1, wherein the test case generator is configured to receive an input of the testing parameter, and the testing parameter prompts selection of the selected action.

4. The software product testing system of claim 1, wherein the format of the expected output comprises at least one of the following: a sorting format, a date format, a time format, and a currency format.

5. A computer implemented method of testing an operation of a software product, comprising:
receiving an indication of whether a native language of a human tester matches a target language of a software product to be tested;
receiving a testing parameter, wherein the testing parameter comprises an attribute that defines a type of test case to be used in testing the software product;
if the native language and the target language are different:
generating a test case in the target language based upon the received testing parameter, wherein the test case comprises an input, an action corresponding to the testing parameter, and an expected output having a format corresponding to a language-specific format rule for the action in the target language, and wherein the expected output is determined based upon the testing parameter, the input, and the action,
applying the test case to the software product by entering the input into a computing device that is running the software product, and receiving a generated output after the software product implements the action,
analyzing the generated output to determine whether the generated output matches the expected output as defined by the testing parameter, and
displaying an indication of whether the generated output matches the expected output as defined by the testing parameter; and
if the native language and the target language are the same:
analyzing a generated output to determine whether the generated output matches an expected output as defined by the testing parameter, and
displaying an indication of whether the generated output matches the expected output as defined by the testing parameter.

6. The computer implemented method of claim 5, wherein the action comprises one or more of the following: sorting, generating a date, generating a time, converting a number to a representation of currency, inserting punctuation, adding a keystroke, and correcting pronunciation.

7. The computer implemented method of claim 5, wherein the target language comprises a language used to test the software product.

8. The computer implemented method of claim 5, wherein displaying an indication comprises notifying a user if the test case was a success.

9. The computer implemented method of claim 5, wherein displaying an indication comprises notifying a user if the test case was a failure.

10. A method of testing an operation of a software product, comprising:
determining whether a native language of a human tester matches a target language of a software product to be tested;
if the native language does not match the target language:
selecting a test case in the target language, wherein the test case is selected based upon a received testing parameter and comprises an input in the target language, an action corresponding to the received testing parameter, and an expected output in the target language, wherein the received testing parameter comprises an attribute of the test case that denotes which type of test is to be performed, and wherein the expected output has a format corresponding to a language-specific format rule for the action in the target language, applying the test case to the software product by entering the input into a computing device that is running the software product, and receiving a generated output after the software product implements the action, automatically analyzing the generated output to determine whether the generated output matches the expected output as defined by the received testing parameter, the input, and the action, and displaying an indication of whether the generated output matches the expected output; and if the native language matches the target language:

automatically analyzing a generated output to determine whether the generated output matches an expected output, and displaying an indication of whether the generated output matches the expected output.

11. The method of claim 10, wherein the action comprises one or more of the following: sorting, generating a date, generating a time, converting a number to a representation of currency, inserting punctuation, adding a keystroke, and correcting pronunciation.

12. The method of claim 10, wherein automatically analyzing the generated output comprises determining whether at least a portion of the expected output has a format that matches an expected format of the target language.

13. The method of claim 12, wherein the expected format comprises at least one of the following: a sorting format, a date format, a time format, and a currency format.

14. The method of claim 10, wherein the selecting comprises:

receiving a testing parameter; and identifying a target language test case that includes an action corresponding to the received testing parameter.

15. The method of claim 10, wherein the selecting comprises:

receiving a testing parameter;

identifying whether any target language test case includes an action corresponding to the received testing parameter; and if no target language test case includes an action corresponding to the received testing parameter, notifying the human tester that the received testing parameter cannot be used to test the software product in the target language.

* * * * *